US012370662B1

(12) United States Patent
Chothia

(10) Patent No.: US 12,370,662 B1
(45) Date of Patent: Jul. 29, 2025

(54) PORTABLE DRILL ATTACHMENT

(71) Applicant: Hormuzd Chothia, Georgetown (CA)

(72) Inventor: Hormuzd Chothia, Georgetown (CA)

(*) Notice: Subject to any disclaimer, the term of this patent is extended or adjusted under 35 U.S.C. 154(b) by 0 days.

(21) Appl. No.: 18/662,369

(22) Filed: May 13, 2024

(51) Int. Cl.
*B25F 3/00* (2006.01)
*B01F 27/2121* (2022.01)
*B01F 27/2323* (2022.01)

(52) U.S. Cl.
CPC ............ *B25F 3/00* (2013.01); *B01F 27/2121* (2022.01); *B01F 27/2323* (2022.01)

(58) Field of Classification Search
CPC ..... B25F 3/00; B01F 27/2121; B01F 27/2323
See application file for complete search history.

(56) References Cited

U.S. PATENT DOCUMENTS 9,999,969 B1 * 6/2018 Walter ............. B01F 33/50115

FOREIGN PATENT DOCUMENTS

CN 108236391 A * 7/2018 ............. A47J 42/46
CN 110757417 A * 2/2020 ................ B25F 3/00
DE 102012203425 A1 * 9/2013 ............. A47J 43/07
DE 102016214945 A1 * 3/2017 ................ B25F 3/00
DE 102017222869 A1 * 6/2018 ............ B23B 45/00
DE 102017222848 A1 * 6/2019
DE 102017222915 A1 * 6/2019 ................ B25F 5/02
EP 3144108 A1 * 3/2017 ................ B25F 3/00

* cited by examiner

*Primary Examiner* — Eyamindae C Jallow
(74) *Attorney, Agent, or Firm* — Orin Del Vecchio

(57) ABSTRACT

A portable drill accessory that is configured to be operably coupled to a portable drill and facilitate mixing or blending of ingredients disposed within the container of the present invention. The present invention includes a container having an interior volume that is sealably coupled to a base housing. The base housing has operably mounted above the upper surface thereof a mixing blade. Disposed in the base housing is a gear assembly wherein the gear assembly is configured to provide rotational movement of the mixing blade. The gear assembly includes a first gear and a second gear that are oriented at a perpendicular angle with respect to each other. The first gear includes a portion operably coupled to the mixing blade. The second gear includes a shaft portion that is configured to be operably coupled to a drill chuck.

7 Claims, 3 Drawing Sheets

PORTABLE DRILL ATTACHMENT

FIELD OF THE INVENTION

The present invention relates generally to portable drill accessories, more specifically but not by way of limitation, a mixer configured to be operably coupled to a chuck of a portable drill wherein the present invention includes a gear drive assembly operably coupled to a housing wherein the housing is configured to have a container sealably secured thereto.

BACKGROUND

Portable drills are well known in the art and are employed for a variety of tasks. While certainly drilling holes with drill bits is a primary task of a portable drill, portable drills of the years have had accessories manufactured to help users perform a plurality of tasks. Accessories such as but not limited to screw driver bits, nut drivers and paint mixers are all items that have been specifically manufactured for drills to help users perform various tasks.

While there are many accessories for portable drills there are still unmet needs of users wherein various applications do not have an available accessory that can be operably coupled to a drill and utilized by a user. Many users of portable drills find themselves in a scenario where they may need to mix a material into a liquid. By way of example but not limited materials such as a powder to thicken a paint or ingredients to make an edible food item such as but not limited to a health shake. The aforementioned task requires a blender which is not convenient to carry to a job site or other places as blenders are not designed for portability.

Accordingly, there is a need for a portable drill accessory wherein the drill accessory of the present invention is designed to operably couple with a chuck of a portable drill and provide mixing of ingredients that are disposed within the container thereof.

SUMMARY OF THE INVENTION

It is the object of the present invention to provide a portable drill accessory that is configured to be operably coupled to a chuck of a portable drill wherein the present invention includes a container having an interior volume operable to receive materials therein.

Another object of the present invention is to provide a portable drill accessory configured to provide mixing of ingredients wherein the present invention includes a base housing that is sealably coupled to the bottom of the container.

A further object of the present invention is to provide a portable drill accessory that is configured to be operably coupled to a chuck of a portable drill wherein the base housing has disposed therein a gear assembly.

Yet a further object of the present invention is to provide a portable drill accessory configured to provide mixing of ingredients wherein the present invention includes a mixing blade disposed within the interior volume of the container proximate the bottom thereof that is operably coupled to the gear assembly.

Still another object of the present invention is to provide a portable drill accessory that is configured to be operably coupled to a chuck of a portable drill wherein the gear assembly includes a housing having a first gear and a second gear disposed therein.

An additional object of the present invention is to provide a portable drill accessory configured to provide mixing of ingredients wherein the first gear and the second gear are operably coupled and are perpendicular in orientation.

Yet a further object of the present invention is to provide a portable drill accessory that is configured to be operably coupled to a chuck of a portable drill wherein the first gear includes a shank portion that extends outward from the housing of the gear assembly.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
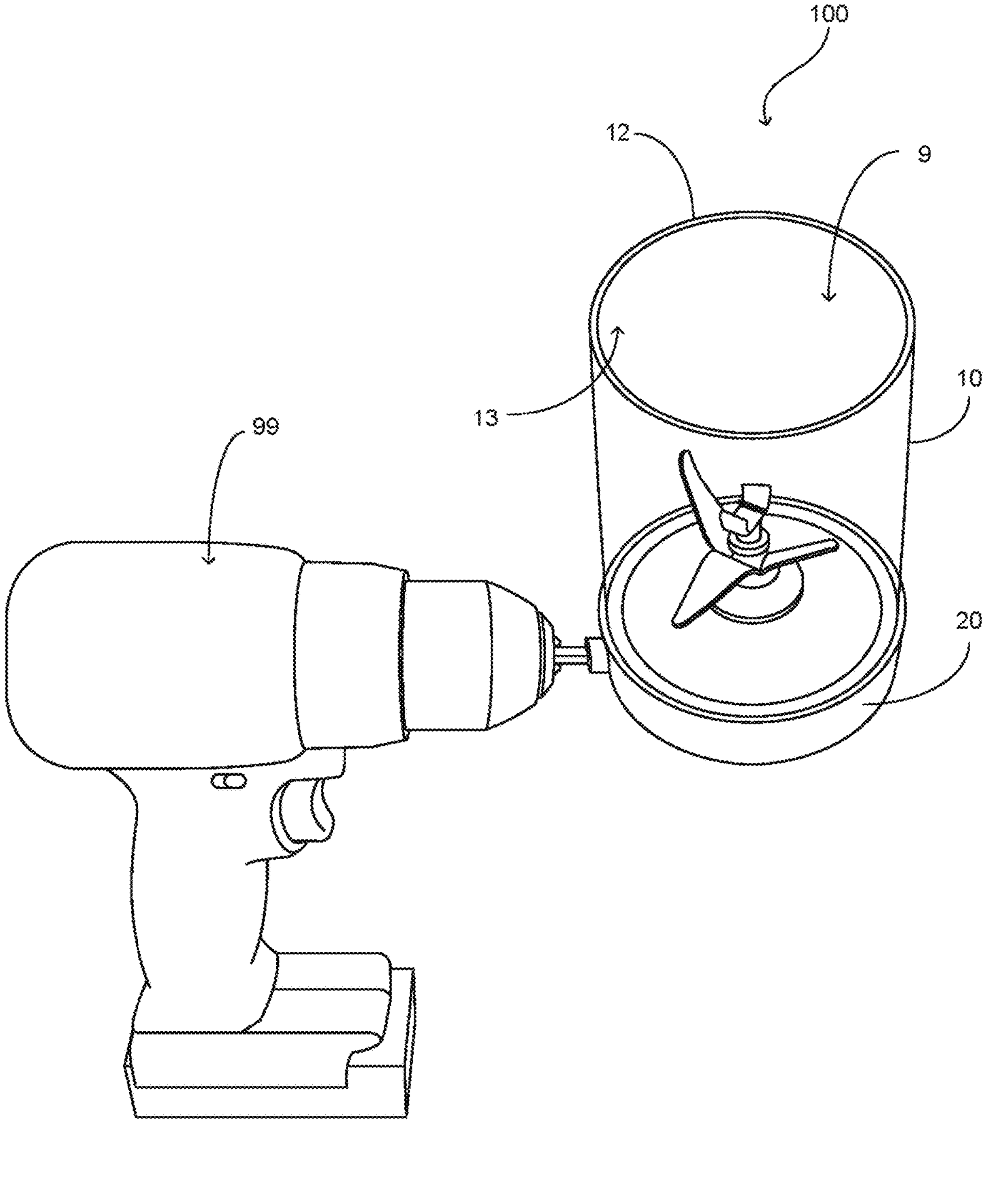
FIG. 1 is a perspective view of the present invention operably coupled to an exemplary portable drill.
Figure 2:
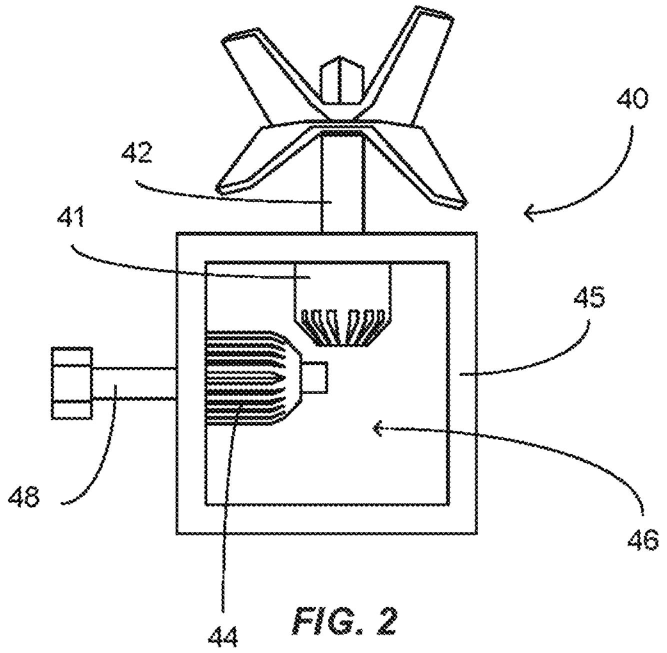
FIG. 2 is a detailed view of the gear assembly of the present invention.
Figure 3:
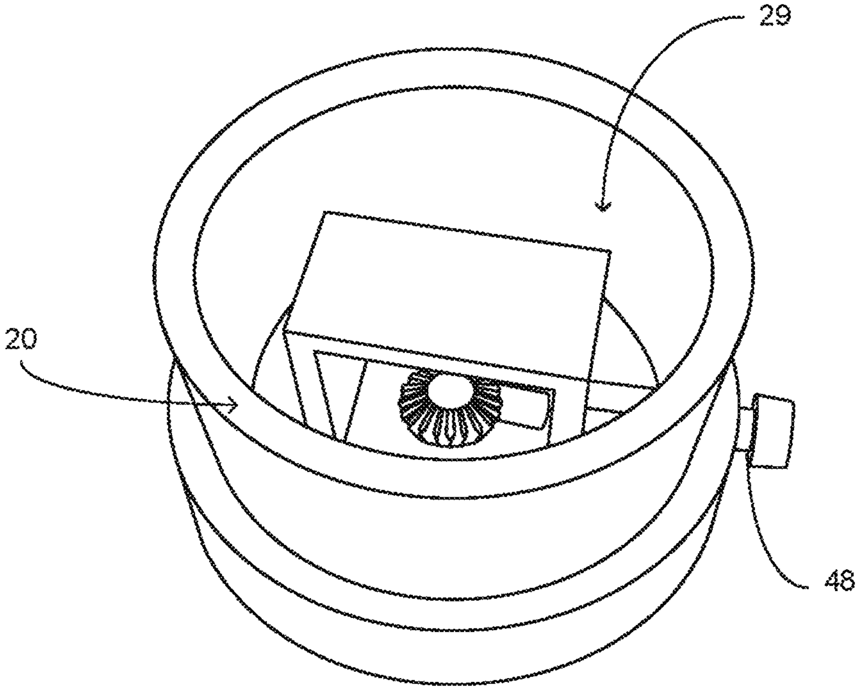
FIG. 3 is a detailed bottom view of the base housing of the present invention having the gear assembly mounted therein.
Figure 4:
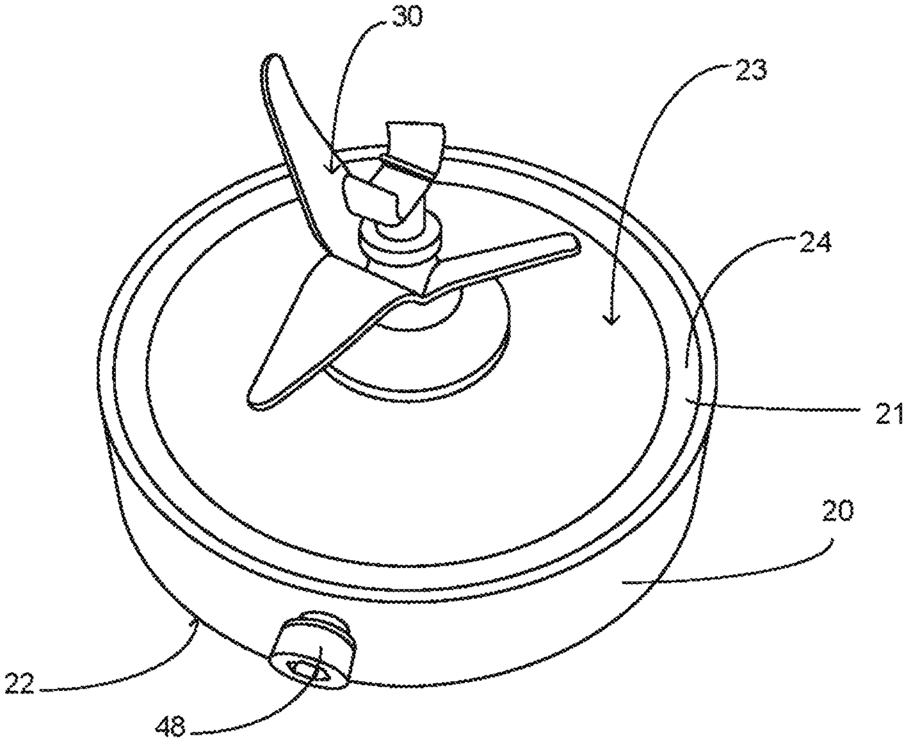
FIG. 4 is a detailed view of the top of the base housing with the mixing blade operably coupled thereto.

Referring now to the drawings submitted herewith, wherein various elements depicted therein are not necessarily drawn to scale and wherein through the views and figures like elements are referenced with identical reference numerals, there is illustrated a portable drill accessory 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to “an element” is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the portable drill accessory 100 is configured to be operably coupled to exemplary portable drill 99 to provide mixing and/or blending of materials that are disposed in the interior volume 9 of the container 10. The portable drill accessory 100 includes container 10 wherein the container 10 includes a wall 12 forming an interior volume 9 having access thereto via opening 13. The container 10 is manufactured from a durable suitable material such as but not limited to plastic. While the embodiment illustrated herein shows the container 10 as being cylindrical in shape having one wall, it is contemplated within the scope of the present invention that the container 10 could be provided in alternate shapes and/or sizes.

The container 10 is sealably coupled to the base housing 20. The base housing 20 is annular in shape having an upper end 21 and a lower end 22. Circumferentially disposed around the perimeter of the base housing 20 on the upper surface 23 thereof is gasket 24, wherein gasket 24 is configured to sealably couple the container 10 and base housing 20. Mounted to the upper surface 23 is mixing blade 30. The mixing blade 30 is rotatably mounted utilizing suitable techniques and wherein the mixing blade 30 is proximate the bottom of the container 10 being operable to facilitate mixing/blending of materials disposed within the interior volume 9 of the container 10.

The mixing blade 30 is operably coupled to gear assembly 40 wherein gear assembly 40 provides operational movement of the mixing blade 30. The gear assembly 40 is disposed in the interior volume 29 of the base housing 20. The gear assembly 40 is comprised of housing 45 wherein the housing 45 forms void 46. Operably disposed within the void 46 is first gear 41 and second gear 44. First gear 41 includes shaft 42 that is operably coupled to mixing blade 30 providing rotation thereof. The second gear 44 includes shaft 48 that extends outward from the housing 45 and is configured to be operably coupled to exemplary drill 99 utilizing a suitable device such as but not limited to a hexagonal bit. The first gear 41 and second gear 44 are conventional pinion style gears and are operably engaged such that the rotational movement of the second gear 44 provides rotational movement of the first gear 41 and as such results in movement of the mixing blade 30. While the gear assembly 40 is illustrated in a preferred embodiment in the Figures submitted herewith, it is contemplated within the scope of the present invention that the gear assembly 40 could be manufactured with alternate elements in place of and/or in conjunction with the elements discussed herein so as to provide the desired functionality of rotational movement of the mixing blade 30.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable drill accessory configured to facilitate mixing or blending of materials wherein the portable drill accessory comprises:

a container, said container having a top end and a bottom end, said container having at least one wall forming an interior volume, said container having an opening at said top end thereof providing access to the interior volume;

a base housing, said base housing configured to mateably couple with said bottom end of said container, said base housing having an upper surface, said base housing having a void below said upper surface;

a gear assembly, said gear assembly disposed within said void of said base housing, said gear assembly having a first gear and a second gear operably coupled, said gear assembly being operably coupled to a mixing blade, said mixing blade being mounted within the interior volume of said container; and wherein said gear assembly is configured to be operably coupled to a drill chuck of a portable drill so as to facilitate rotational movement of the mixing blade.

2. The portable drill accessory configured to facilitate mixing or blending of materials as recited in claim 1, wherein said gear assembly further includes a housing, said housing of said gear assembly having a void and wherein a portion of said first gear and said second gear are disposed within said void of said housing of said gear assembly.

3. The portable drill accessory configured to facilitate mixing or blending of materials as recited in claim 2, wherein said second gear includes a shaft, said shaft of said second gear extending outward from said housing, said shaft configured to be operably coupled to a drill chuck.

4. The portable drill accessory configured to facilitate mixing or blending of materials as recited in claim 3, wherein a portion of said first gear extends outward from said housing and is operably coupled to said mixing blade.

5. The portable drill accessory configured to facilitate mixing or blending of materials as recited in claim 4, wherein said first gear and said second gear are perpendicular in orientation.

6. The portable drill accessory configured to facilitate mixing or blending of materials as recited in claim 5, wherein said container is cylindrical in shape.

7. The portable drill accessory configured to facilitate mixing or blending of materials as recited in claim 6, wherein said first gear and said second gear are pinion gears operably engaged to provide rotational movement of said mixing blade.

* * * * *